(12) United States Patent
Llewellyn

(10) Patent No.: US 7,409,818 B2
(45) Date of Patent: Aug. 12, 2008

(54) HORSESHOE

(76) Inventor: Timothy Charles Llewellyn, Downgate Farm, Three Cups Nr. Heathfield, East Sussex (GB) TN21 9PD ( * ) Notice: Subject to any disclaimer, the term of this patent is extended or adjusted under 35 U.S.C. 154(b) by 0 days.

(21) Appl. No.: 11/572,205

(22) PCT Filed: Jul. 15, 2005

(86) PCT No.: PCT/GB2005/002770

§ 371 (c)(1),
(2), (4) Date: Apr. 20, 2007

(87) PCT Pub. No.: WO2006/008476

PCT Pub. Date: Jan. 26, 2006

(65) Prior Publication Data

US 2008/0016841 A1     Jan. 24, 2008

(30) Foreign Application Priority Data

Jul. 16, 2004   (GB)   ................... 0415898.6

(51) Int. Cl.
*A01L 3/02*   (2006.01)
*A01L 5/00*   (2006.01)
(52) U.S. Cl. .............. 59/61; 59/36; 59/66; 168/DIG. 1; 168/4; 168/5
(58) Field of Classification Search ........... 59/36, 59/61, 66; 168/DIG. 1, 4, 14, 12, 17, 21, 168/22, 24, 28, 31, 42
See application file for complete search history.

(56) References Cited

U.S. PATENT DOCUMENTS

| | | | | |
|---|---|---|---|---|
| 3,285,346 | A | | 11/1966 | Jenny |
| 3,494,422 | A | * | 2/1970 | Clark ............... 168/4 |
| 4,206,811 | A | * | 6/1980 | Dallmer ............ 168/4 |
| 4,580,637 | A | * | 4/1986 | King ................ 168/7 |
| 4,765,411 | A | | 8/1988 | Tennant |
| 4,878,541 | A | * | 11/1989 | Pedersen .......... 168/4 |
| 5,165,481 | A | * | 11/1992 | Duckett ........... 168/4 |
| 5,213,163 | A | * | 5/1993 | Schaffer .......... 168/4 |
| 5,222,561 | A | * | 6/1993 | Fisher et al. ...... 168/12 |
| 5,319,918 | A | | 6/1994 | Bauer |
| 6,349,773 | B1 | * | 2/2002 | Logan ............. 168/24 |
| 7,278,495 | B2 | * | 10/2007 | Kolonia, Sr. ....... 168/4 |

FOREIGN PATENT DOCUMENTS

GB        1405211   *   9/1975

* cited by examiner

*Primary Examiner*—David B Jones
(74) *Attorney, Agent, or Firm*—Townsend and Townsend and Crew LLP

(57) ABSTRACT

A method of making a composite horseshoe to a bespoke design to fit a specified hoof of a specified horse includes the step of providing a template horseshoe adapted to fit the specific hoof of the specified horse. A mould is constructed of the template horseshoe, and the mould is filled with a plastic material mixed with wear resistant particles to replicate the template horseshoe.

5 Claims, 2 Drawing Sheets

HORSESHOE

Figure 1:
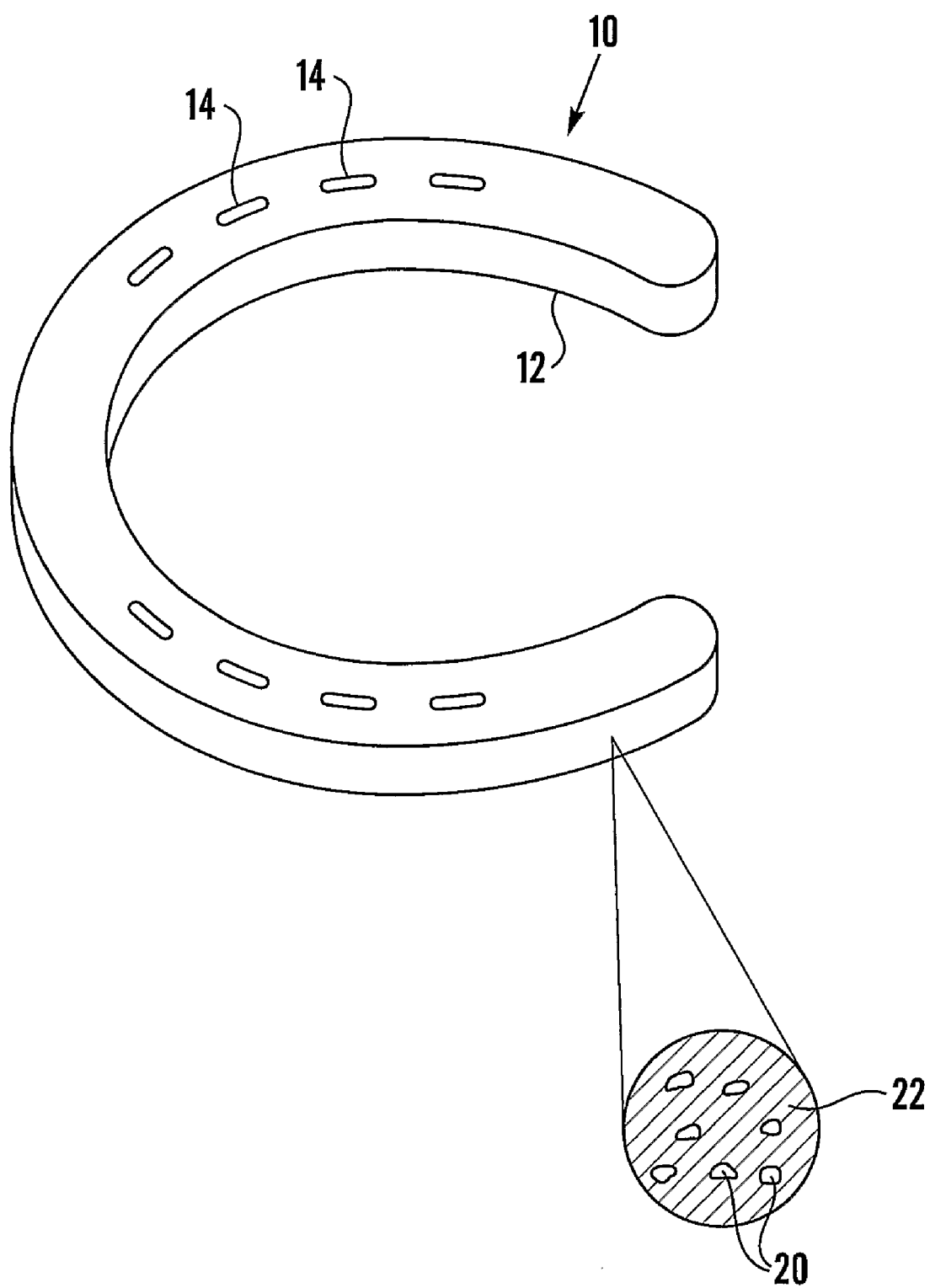

The present invention relates to horseshoes, particularly but not exclusively for use with competition horses.

Conventional horseshoes are made from iron, and consequently are relatively cheap to manufacture and fit, and are relatively hard wearing. However, the natural properties of iron mean that conventional horseshoes are not always suitable for horses in certain situations. Iron is relatively heavy, and thus less dense materials are preferred where saving weight might be important, e.g. for horses in racing and jumping competitions. For example, aluminium horseshoes or "plates" are available, but are prone to rapid wear and can be difficult to fix securely to the horses' hooves. Indeed, such difficulties can add significantly to farrier costs and result in weakened hooves. Another "light" metal, titanium, is sometimes used in conjunction with aluminium to improve wear rate, but is not without difficulties. Titanium alloy horseshoes are more complex to manufacture than iron or aluminium counterparts, are only available in set designs and standard sizes, and are difficult for the farrier to adjust on site when fitting to horses' hooves.

It is known to use so-called "surgical horseshoes" made from plastics material when a horse requires a degree of shock absorbency not afforded by metal horseshoes, e.g. when the horse is recovering from a leg injury. The surgical horseshoe takes advantage of the resilient properties of certain plastics materials.

GB 2 222 757 discloses a horseshoe comprising a body moulded from a wear-resistant substantially rigid thermoplastics material, having a substantially rigid core of fibre reinforced plastics which extend along the full length of the shoe. WO03/041497 discloses a horseshoe made of synthetic materials (e.g. polyurethane plastics) with a sectional profile comprising one or more upright members, connecting ground and hoof faces and running side by side along the arcuate length of the shoe. In both cases, the horseshoes have a sophisticated construction which does not lend itself to low volume production for bespoke orders e.g. tailored to a specific horse.

In accordance with a first aspect of the present invention, there is provided a method of making a composite horseshoe for a specified hoof of a specified horse, comprising: providing a template horseshoe adapted (i. e. further designed and shaped) to fit the specified hoof of the specified horse; constructing a mould of the template horseshoe; and filling the mould with a plastics material mixed with wear resistant particles to replicate the template horseshoe.

The present applicant has appreciated that some of the problems associated with "off-the-shelf" lightweight horseshoes (e.g. known horseshoes of aluminium, titanium or even previously proposed plastics materials) may be obviated by making bespoke or "made-to-measure" composite horseshoes in accordance with the present invention. The template horseshoe may be a conventional horseshoe (e.g. an iron horseshoe of a predetermined size and form), the required final design of which a farrier has adjusted or crafted in situ to fit the unique shape and requirements of a particular horse's hoof in a conventional manner. However, before such a "retrofitted" conventional horseshoe is worn, it is used as the template for moulding a composite horseshoe identical to it. In this way, the resulting composite horseshoe will inherently fit the specified hoof of the specified horse, possibly subject to minor adjustment only. It is thus possible for the first time for a farrier to fit such a composite horseshoe as easily as the "retro-fitted" conventional horseshoe. Furthermore, the resulting composite horseshoe will have desirable weight and wear characteristics.

The mould may be constructed from a resilient material (e.g. vulcanised rubber). The mould may comprise at least two parts, with one part separable from the other(s). The mould may be constructed by casting the resilient material around the template horseshoe, with the parts formed with release agent therebetween or even by subsequently cutting the resilient material to strip the template horseshoe therefrom.

The plastics material may be a liquid when filling the mould, and allowed to solidify thereafter. The plastics material may be a thermosetting plastics material, e.g. a two-part epoxy resin. The method may further comprise pouring the thermosetting plastics material into the mould, and allowing it to set before extracting the composite horseshoe from the mould. Alternatively, the plastics material may be a thermoplastic plastics material, in which case the method may comprise injecting molten plastics material into the mould.

The wear resistant particles may comprise crushed stone (e.g. garnet powder), metal-based particles (e.g. tungsten carbide), or other abrasive material (e.g. carburundam). The wear-resistant particles may be selected by controlling particle size and density to produce a layered structure to the composite horseshoe resulting from gravitational influences during solidification of the plastics material. For example, the wear-resistant particles may not be uniformly distributed, and instead may be concentrated by settling under gravity towards one part of the composite horseshoe, e.g. towards what in use will be its ground-engaging face.

The method may further comprise introducing a component into the mould prior to filling with the plastics material mixed with wear-resistant particles, the component being configured to receive at least one stud once embedded in the composite horseshoe.

The mould may be constructed using four template horseshoes, one for each hoof of the specified horse. Each mould cavity may be interconnected, enabling four composite horseshoes replicating the four template horseshoes to be made at the same time.

In accordance with another aspect of the present invention, there is provided a composite horseshoe having a body comprising particles embedded in a matrix of plastics material, the particles having greater wear resistance than the matrix, wherein the body is configured to fit a specified hoof of a specified horse. In this way, the particles impart additional strength and/or wear resistance to the body of the composite horseshoe, with the matrix acting as a binding agent to hold the particles together. At the same time, the weight of the composite horseshoe may be less than 100 grams (e.g. 50-70 grams).

The matrix may comprise a thermoplastic plastics material, or a thermosetting plastics material which softens when heated. Heating the matrix may help a farrier to adjust such horseshoes to accommodate localised or seasonal changes to individual hooves.

The particles may comprise particulate or granular matter, e.g. metal particles or grains of sand. As well as increasing wear resistance, the particulate or granular matter may be selected to vary the composite horseshoe's co-efficient of friction to adjust grip. Additionally the composite horseshoe may comprise elongate members, e.g. fibrous matter e.g. fibreglass, carbon fibres, Kevlar, or reinforcement rods, e.g. metal rods. The elongate members may lend strength to the body.

The present applicant has appreciated that a composite horseshoe according to the present invention may be economically produced in low volumes for bespoke orders.

Figure 2:
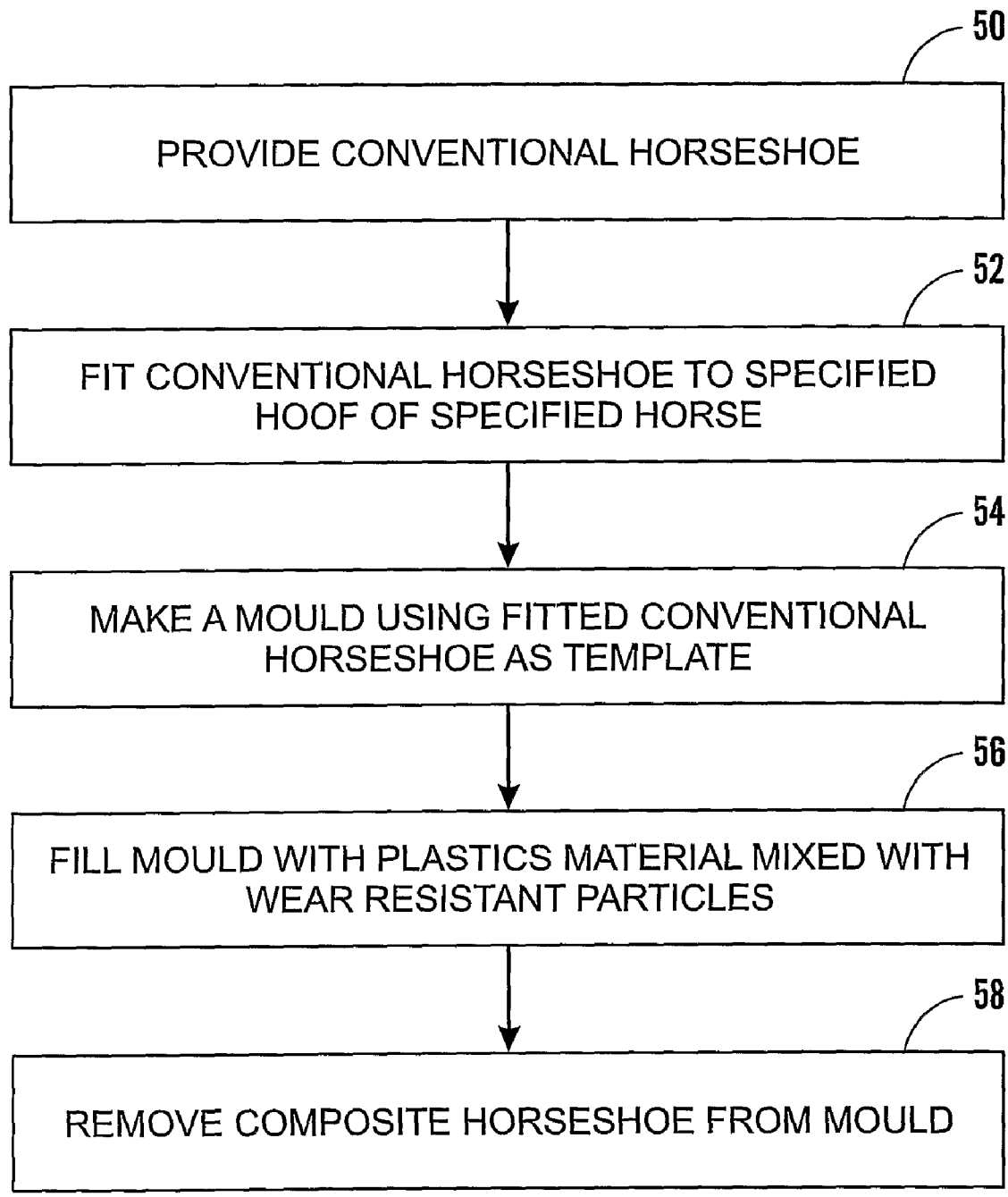

An embodiment of the invention will now be described with reference to the figures in which:

FIG. 1 illustrates schematically a composite horseshoe embodying one aspect of the present invention; and FIG. 2 illustrates schematically a method of manufacturing the composite horseshoe of FIG. 1.

FIG. 1 shows a schematic, partially cut-away view of a composite horseshoe (10) embodying the present invention. The composite horseshoe (10) comprises a C-shaped body (12) with nail holes (14) for use when securing the horseshoe (10) to a horse's hoof. The body (12) comprises particles (20) embedded in a matrix (22) of plastics material, e.g. high density polyethylene. The particles (20) include hard particles of metal or ceramic. The body (12) may also include fibres of glass or carbon (not shown) aligned to be substantially parallel to the curved sides of the body (12). The body (12) is pre-shaped to fit one specified hoof of a specified horse, as described below.

FIG. 2 shows schematically a method of manufacturing the composite horseshoe (10). A conventional horseshoe (e.g. or iron) is provided at step (50). The conventional horseshoe is fitted at step (52) by a farrier to a specific hoof of a specific horse. The farrier may fit the conventional horseshoe by heating and mechanically working it to achieve a design profile which corresponds to that of the specified hoof. Once adapted to achieve the desired shape, the conventional horseshoe is used as a template and a mould is made from it at step (54). The mould is then filled at step (56) with plastics material mixed with wear resistant particles, and thereafter the resulting composite horseshoe (10) replicating the made-to-fit conventional horseshoe is removed from the mould at step (58).

The invention claimed is:

1. A method of making a composite horseshoe to a bespoke design to fit a specified hoof of a specified horse, comprising:
    providing a template horseshoe adapted to fit the specified hoof of a specified horse;
    constructing a mould of the template horseshoe; and
    filling the mould with a plastics material mixed with wear-resistant particles to replicate the template horseshoe, wherein the mould is constructed by forming a body of resilient material around the template horseshoe, the body having at least two parts for removal of the template horseshoe.

2. The method according to claim 1, in which the plastics material is a liquid when filling the mould.

3. A method according to claim 2, further comprising concentrating the wear-resistant particles toward a predetermined part of the mould as the plastics material solidifies therein.

4. A method according to claim 2, in which wear-resistant particles concentration comprises orientating the mould to allow wear-resistant particle movement under gravity towards the predetermined part of the mould prior to solidification of the plastics material.

5. A method according to claim 1, further comprising introducing a component into the mould prior to filling with the plastics material mixed with the wear-resistant particles, the component being configured to retain at least one stud once embedded in the composite material.

\* \* \* \* \*